June 6, 1950

B. L. BRADY 2,510,374

OPTICAL ASSEMBLY FOR PROJECTING AN IMAGE OF LUMINOUS CHARACTERISTICS UPON LIGHT RESPONSIVE ELEMENT

Filed Nov. 29, 1946

INVENTOR
BERNARD L. BRADY
BY *H.S. Grover*
ATTORNEY

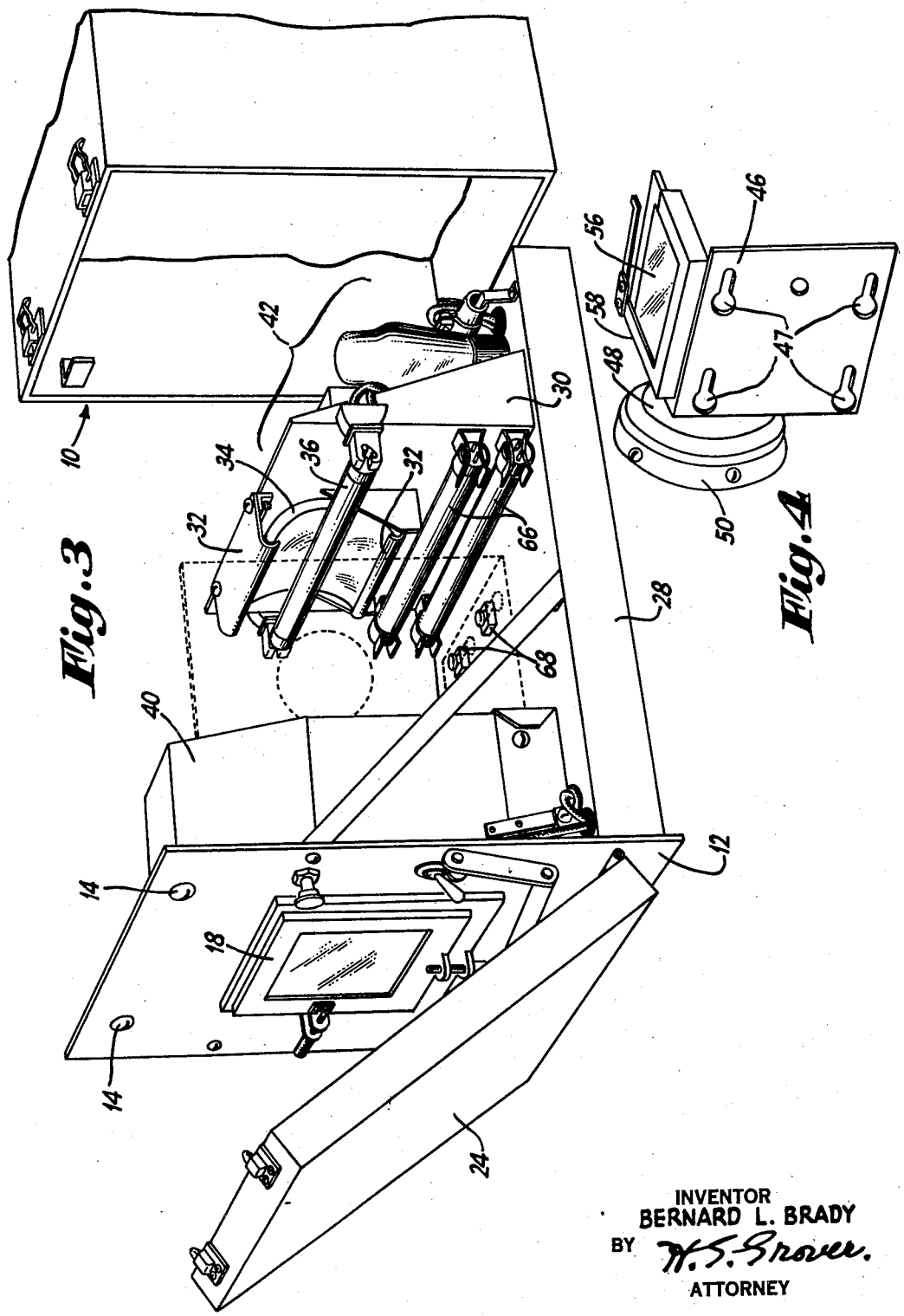

Patented June 6, 1950

2,510,374

UNITED STATES PATENT OFFICE 2,510,374

OPTICAL ASSEMBLY FOR PROJECTING AN IMAGE OF LUMINOUS CHARACTERISTICS UPON LIGHT RESPONSIVE ELEMENT

Bernard L. Brady, Gibbsboro, N. J., assignor to Radio Corporation of America, a corporation of Delaware Application November 29, 1946, Serial No. 712,826

7 Claims. (Cl. 88—24)

The present invention relates to optical devices, and more particularly relates to a compact and portable optical assembly for projecting an image of desirable luminous characteristics onto a light-responsive element for the purpose of testing or aligning such element and/or the equipment of which such element forms a part.

In the manufacture of certain types of electro-optical apparatus, such, for example, as that employed in television transmitting systems for the purpose of converting variations in the light emanating from each elemental area of an image being televised into corresponding electrical variations, it is desirable to project a selected test pattern onto the light-responsive electrode of a television camera, or pickup, tube so that the response of the camera tube and/or the remainder of the conversion apparatus may be readily determined. It is apparent that the luminous characteristics of the test pattern thus produced must remain uniform during the period of its use, as otherwise a proper alignment of the equipment under test cannot be obtained.

It has been found that many of the difficulties previously experienced in the testing of apparatus such as the above were traceable to the light source used in the projector units. Since these light sources did not necessarily operate at identical temperatures, the spectral distribution of the emitted light varied accordingly, resulting in misleading, or erroneous, data. Furthermore, the amount of correction introduced by the use of filters in the system was open to question.

Another difficulty in previously used projection devices resided in the fact that control over the intensity, or level, of illumination of the test pattern was obtained by varying the filament voltage of the lamp acting as the light source. This illumination level could not be thus controlled with sufficient preciseness to insure accurate results, and, in addition, the resulting temperature changes of the light source caused changes in the spectral distribution of the test pattern. This produced errors in the alignment process. As a still further drawback, the size and mode of construction of these known projector arrangements made them generally suited only for fixed installations, and precluded their use as portable equipment.

An additional characteristic of formerly used projector units resided in the fact that the lens of the apparatus under test had to be removed during the aligning operation. This was undesirable, since such lenses were often replaced with improper focus.

According to one embodiment of the present invention, a compact projector unit is provided which includes both an optical system and a power supply therefor. The latter is adapted for operation on standard A.-C. line voltages, and furnishes D.-C. power suitable for the operation of a single tubular fluorescent lamp. This lamp is positioned approximately at the center of curvature of a semi-cylindrical reflecting element, and the light rays which are reflected from such element pass through a condenser lens assembly to illuminate uniformly the surface of a test slide having a desired pattern thereon.

The optical image representative of this test pattern then passes through a further compound lens which may, in one modification, be similar to the lens employed in the particular conversion apparatus under test. The focal length of this last-mentioned lens is set for infinity—that is, the light rays emerge from such lens along substantially parallel paths. These parallel rays are then received by the lens which forms a part of the conversion apparatus.

Since the light rays between the respective lenses of the apparatus being tested and the optical alignment unit are parallel, it will be appreciated that the distance between these lenses is not critical within rather wide limits. Furthermore, if the two mentioned lenses are identical, there is no magnification in the optical system, and the size of the pattern on the slide is also the size of the image on the light-responsive electrode of the camera tube.

In order to control the degree of illumination of the projected test pattern on the camera tube mosaic or photocathode, an iris diaphragm is provided in the optical path between the corresponding lenses of the projector unit and conversion apparatus. This iris diaphragm is preferably calibrated directly in foot-candles for a predetermined lamp current. It is then only necessary to correct for whatever light transmission loss is caused by the slide itself.

To provide for portability of the projector unit, the lamp, reflecting element, condenser lens and power supply are compactly arranged in a cabinet of relatively small dimensions. A handle is provided for carrying the unit from place to place. A protective cover is hinged to one edge of the cabinet, and this cover is adapted to overlie, when closed, the front panel of the cabinet. This front panel is provided with an aperture in back of which the condenser lens assembly is mounted.

When the hinged cover mentioned above is open, it lies flat against the surface upon which the projector unit rests, or, in other words, the cover occupies a substantially horizontal position. Means are provided on the inner surface of this hinged cover for detachably receiving the compound lens and iris diaphragm, so that these elements are fixed in position at a predetermined distance from the opening in the front panel determined by the focal length of the compound lens. Thus, when the projector unit is so set up, the iris diaphragm, the compound lens, the condensing lens, the slide, and the opening in the cabinet wall all are in the optical path of the light rays reflected from the reflector element. Furthermore, the rays emanating from the projector unit follow paths which are substantially parallel to one another, as above brought out.

In order to arrange the projector unit for movement to another location, the iris diaphragm and compound lens are released as a unit from their mounting on the inner surface of the hinged cover. The projector chassis is withdrawn from the cabinet, and the iris diaphragm and compound lens unit is demountably attached to the chassis so as to occupy a space between the reflector element and the condenser lens. The chassis is again placed within the cabinet, and the hinged cover actuated to closed position so as to overlie the front panel. The reflector unit is now in condition for convenient transportation to another location.

One object of the present invention, therefore, is to provide an optical assembly for projecting an image of desirable luminous characteristics toward the focal plane of a light-responsive element.

A further object of the invention is to provide an assembly of the above type which is compact in nature and conveniently portable.

A still further object of the invention is to provide an improved equipment for testing and aligning electro-optical apparatus.

Other objects and advantages will be apparent from the following description of a preferred form of the invention and from the drawings, in which:

Fig. 3 is a perspective view of Fig. 1, showing the apparatus being placed in portable condition; and Fig. 4 is a bottom view of a portion of the apparatus of Fig. 1.

Figure 1:
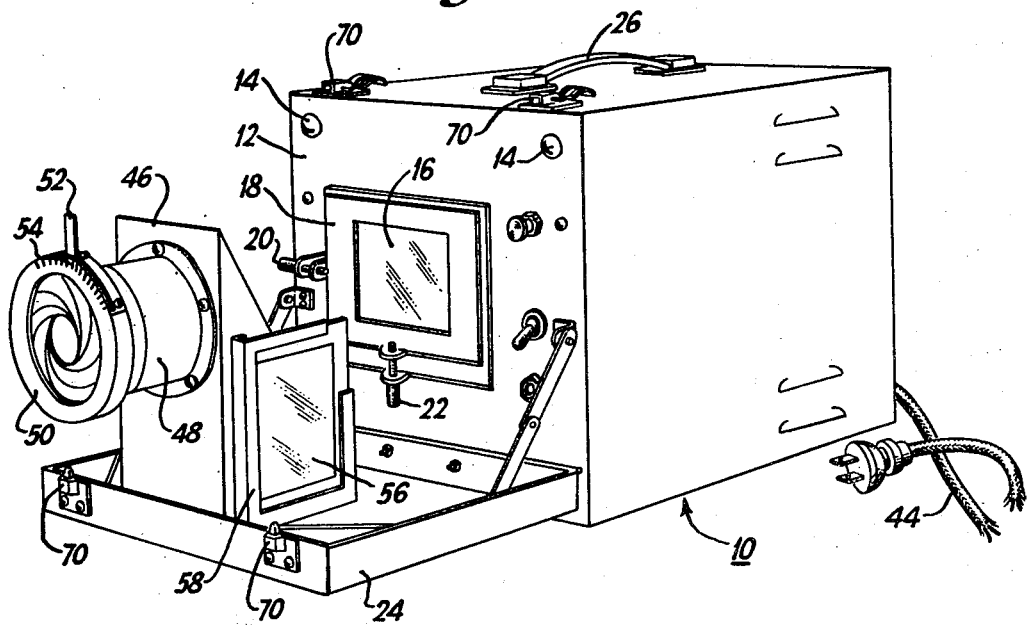
Fig. 1 is a perspective view of an optical apparatus in accordance with the present invention, showing the elements in position for operation.

Referring first to Fig. 1, there is shown an optical testing and aligning unit which includes a cabinet or housing generally indicated by the reference character 10. This cabinet 10 may be of rectangular cross-section, and is preferably integrally formed except that one surface 12 thereof, acting as the front surface or panel of the optical unit, may be detached from the remainder of the cabinet or housing by the removal of the locking screws 14.

Centrally located in the panel 12 is an opening 16. A rectangular slide holder 18 is mounted on the panel 12 so as to frame the opening 16. A pair of adjusting screws 20 and 22 is provided to permit horizontal and vertical alignment, respectively, of the slide receivable in the slide holder 18.

A protective cover 24 is hinged to, or near, the lower edge of the front panel 12 of the optical unit. This cover 24 is adapted to lie in substantially horizontal position when open, as best shown in Fig. 1, and to lie substantially face-to-face with the front panel 12 when in closed position. Cover 24 in the latter position acts as a protective member for the slide holder 18, and also acts to convert the projector unit into a compact and portable assembly. A handle 26 is provided to facilitate carriage thereof.

Referring now to Fig. 3, it will be seen that the chassis of the projector unit includes a base member 28 which is securely attached by any suitable means (not shown) to the front panel 12. On this base member 28 is mounted a reflector support 30 having a pair of clamps 32 for holding and positioning a reflecting element 34. This reflecting element 34 may comprise a semi-cylindrical section of transparent tubing. One example of such a material is Pyrex glass. The outer surface of the transparent tubing is rendered reflective by the addition of a thin coating of a substance such as silver or aluminum. As a result of this mode of construction, the necessity for frequent cleaning of the reflecting surface is eliminated, together with the possibility of damage resulting therefrom. Furthermore, the durability of a reflecting element constructed in this manner is high in comparison with conventional reflectors. The reflecting element 34 is positioned by the clamps 32 so that the inner surface of the reflector faces the rear surface of the panel 12, as illustrated.

Figure 2:
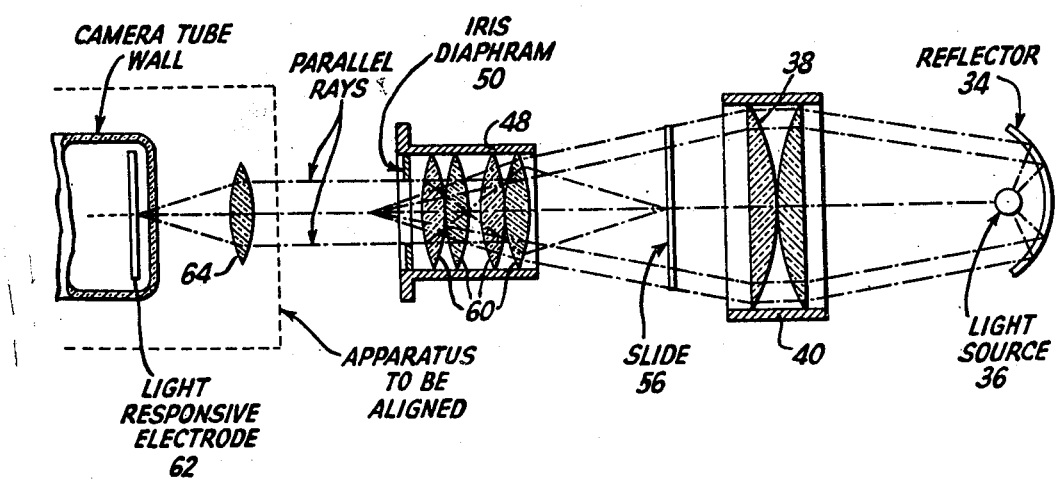
Fig. 2 is a schematic showing of the optical principles involved in that embodiment of the present invention illustrated in Fig. 1.

Also mounted on the support 30 is a tubular fluorescent lamp 36. Lamp 36 is so positioned with respect to the semi-cylindrical reflecting element 34 that the longitudinal axis of the lamp lies approximately at the axis of curvature of the reflecting element. Accordingly, light rays produced by the lamp 36 are reflected from the semi-cylindrical reflecting element 34 toward a condensing lens assembly 38 (see Fig. 2) located within a housing 40. The latter is mounted on the chassis 28 adjacent the rear surface of the panel 12, as shown in Fig. 3. The size of the condensing lens assembly 38 and the shape of the reflecting element 34 are so chosen that substantially all the light rays reflected from the element 34 are received by the lens assembly 38. The latter acts to direct these light rays through the opening 16 in the panel 12, and thence toward the opening in the slide holder 18.

D.-C. power for energizing the tubular fluorescent lamp 36 is obtained from a power supply unit generally designated in Fig. 3 by the reference numeral 42. This power supply unit 42 is mounted on the chassis base 28 in a position to the rear of the reflector-support 30. It is adapted to receive A.-C. power from any standard outlet over the line cord 44, and to convert this A.-C. power into a substantially steady voltage suitable for operation of the lamp 36. Inasmuch as the electrical details of the power supply unit 42 form no specific part of the present invention, they will not be described herein. It will be appreciated that many types of power supply units are known in the art which are capable of performing the function herein stated.

Referring again to Fig. 1, there is shown a support 46 which is adapted to be detachably secured to the inner surface of the hinged cover 24. The means for detachably securing the support 46 to the cover 24 may be of any known type, and may, for example, consist of a plurality of slotted studs secured to the inner surface of the hinged panel 12 and lockably receivable in suitably shaped openings 47 in the base portion of the support member 46 (see Fig. 4). Irrespective of the particular type of engaging means employed, the member 46 is intended to be rigidly supported and positioned on the hinged cover 24 when the latter is in open position, as shown in Fig. 1, so that a cylindrical lens holder or mount 48 carried by the support 46 is in the optical path of the light rays passing through the opening 16 in the panel 12.

Coaxially mounted on the outer end of the lens holder 48 is an iris diaphragm 50. This diaphragm 50 may be of known construction, and is adapted to provide a circular opening of a diameter determined by the adjustment of a manually actuatable lever 52. A scale 54 is provided on the periphery of the iris diaphragm 50, so that the size of the diaphragm opening may be indicated directly by the position of the lever 52.

A pair of test slides 56 are carried in a holder 58 attached to one side of the support 46. When either of the slides 56 is in operating position in the slide holder 18, energization of the lamp 36 will cause light rays from the reflecting element 34 to pass through the condensing lens 38, one of the slides 56, and toward the compound lens 60. This lens 60 in turn causes the light rays to follow paths which are substantially parallel to one another upon their emergence from the iris diaphragm 50, as may be seen by reference to Fig. 2.

When the projector unit of the present invention is in use, the parallel light rays emerging from the iris diaphragm 50 are directed toward the equipment to be tested or aligned. This equipment may, for example, include the light-responsive electrode 62 upon which the parallel light rays emerging from the iris diaphragm 50 are focused by means of a lens 64 forming part of the equipment being tested. It will be clear that, since the light rays are parallel between the iris diaphragm 50 and the lens 64, the separation distance between these elements is not critical, and rather wide variations in this distance will have no appreciable effect upon the results obtained.

It will also be understood that filters of various types may be employed between the compound lens 60 of the projector unit and the lens 64 of the equipment being tested. This is frequently necessary, for example, when such tested equipment comprises a television camera tube of the "Orthicon" type.

A pair of spare fluorescent lamps 66 may, if desired, be carried by the support 30 below, and in substantially parallel relation with, the operating lamp 36. This permits a quick replacement of the latter in case of a burning out or other failure of the lamp then in use.

Referring again to Fig. 3, it will be seen that the projector unit of the present invention may be easily and quickly placed in condition for transportation from one locality to another. To accomplish this, the unit assembly including the support 46, the lens holder 48, the iris diaphragm 50, and the slide holder 58 is removed from its position as shown in Fig. 1 by detaching it from the hinged cover 24. The locking screws 14 are then removed to allow the chassis 28 to be withdrawn from the cabinet 10. The unit assembly above mentioned, including the elements 46, 48, 50 and 58, is then demountably attached to the chassis 28 in the position shown by the dotted lines in Fig. 3—that is, between the reflector element 34 and the condenser lens housing 40. A plurality of slotted studs 68 (which may be identical to those on the inner surface of the cover 24) are provided on the top surface of the chassis 28 for the purpose of receiving this unit assembly. The chassis 28 is then enclosed within the cabinet 10 and locked in place by means of the screws 14. The hinged cover 24 is actuated to closed position so that it lies substantially face-to-face with the panel 12. A pair of catches 70 (Fig. 1) are provided for the purpose of locking the cover 24 in closed position. The reflector unit is then ready for transportation.

The calibrated scale 54 associated with the iris diaphragm 50 should preferably be employed only when the lens (such as 64) of the equipment under test has similar optical properties to the lens 60 of the projector unit. In cases where these two lenses 60 and 64 are dissimilar, it will usually be necessary to calibrate the diaphragm opening independently.

It will be appreciated that the optical unit of the present invention eliminates the necessity for removal of the lens in the equipment under test in order to project a pattern on the light-responsive electrode thereof, as was the case in many projector units previously employed. In such known systems, the lens was often remounted with improper focus, and resulted in unsatisfactory operation of the equipment.

Due to the constant output of the fluorescent lamp 36, the projector unit of the present disclosure can be used repeatedly to secure uniform results. Uniformity is further assured by the fact that the iris diaphragm 50 is used to control the level of illumination, rather than by attempting to control the filament voltage of the lamp 36.

The optical assembly herein described constitutes an improvement over apparatus previously used for similar purposes from the standpoint of light stability, spectral distribution, ease of framing the projected pattern on the light-responsive element, and flatness of field with small diaphragm openings. A further feature is that the lens of the apparatus under test need not be removed. In addition, the resolution of the projected image is found to be higher than has been obtained with previously used apparatus.

I claim:

1. In an optical assembly for projecting an image of desirable luminous characteristics onto the focal plane of a light-responsive element, the combination of a cabinet having a front panel formed with an aperture therein, a slide holder adapted to receive a slide, means for securing said slide holder to said front panel so as to frame said aperture, a protective cover hinged to said cabinet so as to overlie said front panel when closed, a chassis member within said cabinet and secured to the rear surface of said front panel, a condenser lens assembly mounted on said chassis member adjacent said aperture, a reflector support mounted on said chassis member in spaced-apart relation to said condenser lens assembly, a reflector element positioned by said support, a light source also positioned by said support in such a manner that light rays emanating from said source are reflected from said reflector element through said condenser lens, said aperture, and toward said slide, a further lens assembly, and a mount for said further lens assembly, said mount being adapted to be demountably attached to the inner surface of said protective cover when said cover is in open position, so that said further lens assembly is positioned to receive the light rays which have passed through said slide and to cause said rays to follow substantially parallel paths toward said light-responsive element.

2. An optical assembly according to claim 1, further comprising an iris diaphragm carried by said further lens mount.

3. An optical system according to claim 1 in which said reflector element is of semi-cylindrical configuration, said light source being positioned approximately at the axis of curvature of said reflector element.

4. An optical assembly according to claim 1, in which said light source comprises a tubular fluorescent lamp.

5. An optical assembly according to claim 1, further comprising means for demountably attaching said further lens mount to said chassis member between said condenser lens and said reflector element when said protective cover is in closed position.

6. An optical assembly according to claim 1, further comprising a power unit for supplying energy to said light source, said power unit being mounted on said chassis member adjacent to said reflector support.

7. In a projector, a tubular light source, a cylindrically shaped reflector adapted to reflect light rays from said source, the axes of the source and reflector being substantially coincident and the source being longer than the reflector and extending beyond each end thereof, a condensing lens positioned in the optical path of the light rays reflected from said reflector, a cabinet enclosing said light source, reflector and condensing lens, said cabinet being provided with an aperture located in the optical path of the light rays from said condensing lens, a hinged protective cover for that portion of said cabinet containing the aperture, and a lens assembly removably mounted on said cover when the latter is in open position so that said assembly is fixedly and rigidly in alignment with the aperture, said lens assembly when so mounted being adapted to receive the light rays passing through said aperture and to cause said light rays to travel along paths substantially parallel to one another, and means for removably mounting said assembly within said cabinet when said cover is in closed position.

BERNARD L. BRADY.

REFERENCES CITED

The following references are of record in the file of this patent:

UNITED STATES PATENTS

| Number | Name | Date |
|---|---|---|
| 564,177 | Hastings et al. | July 14, 1896 |
| 1,101,414 | Daley et al. | June 23, 1914 |
| 1,172,628 | Partington | Feb. 22, 1916 |
| 1,364,278 | Hochstetter | Jan. 4, 1921 |
| 1,521,122 | Newman | Dec. 30, 1924 |
| 1,779,635 | Newman | Oct. 28, 1930 |
| 1,835,503 | Lemke | Dec. 8, 1931 |
| 1,850,103 | Hall | Mar. 22, 1932 |
| 1,946,139 | Hall | Feb. 6, 1934 |
| 2,127,590 | Erwood | Aug. 23, 1938 |
| 2,187,071 | Bergmans | Jan. 16, 1940 |
| 2,195,392 | Van Alphen | Mar. 26, 1940 |
| 2,231,765 | Landrock | Feb. 11, 1941 |
| 2,285,915 | Dutton | June 9, 1942 |
| 2,312,294 | Worthington et al. | Feb. 23, 1943 |
| 2,389,087 | Schubert | Nov. 13, 1945 |